United States Patent [19]

Fowler

[11] Patent Number: 4,999,231
[45] Date of Patent: Mar. 12, 1991

[54] METHOD AND PRODUCT TO ENHANCE ELECTRICAL CONDUCTIVITY OF FILMS CONTAINING CONDUCTIVE CARBON BLACK

[75] Inventor: James E. Fowler, Spartanburg, S.C.

[73] Assignee: Milliken Research Corporation, Spartanburg, S.C.

[21] Appl. No.: 475,399

[22] Filed: Feb. 5, 1990

Related U.S. Application Data

[63] Continuation-in-part of Ser. No. 342,006, Apr. 24, 1989, abandoned.

[51] Int. Cl.$^5$ ............................................. D04H 1/04
[52] U.S. Cl. ..................................... 428/95; 264/22; 264/154; 252/511; 428/97; 428/137; 428/244; 428/408; 428/934; 524/911
[58] Field of Search ............... 264/22, 25, 154, 156, 264/324, 105, 108; 428/95, 97, 137, 244, 408, 934; 252/511; 524/911

[56] References Cited

U.S. PATENT DOCUMENTS

| | | | |
|---|---|---|---|
| 2,986,777 | 6/1961 | Carter | 264/101 |
| 3,880,966 | 4/1975 | Zimmerman et al. | 264/156 |
| 4,107,361 | 8/1978 | Parker | 264/156 |
| 4,438,059 | 3/1984 | Mollman et al. | 264/105 |
| 4,529,639 | 7/1985 | Peoples, Jr. et al. | 264/243 |
| 4,579,764 | 4/1986 | Peoples, Jr. et al. | 264/243 |
| 4,662,969 | 5/1987 | Wang et al. | 264/154 |
| 4,663,103 | 5/1987 | McCullough et al. | 264/211.23 |
| 4,670,075 | 6/1987 | Heckel et al. | 264/156 |
| 4,784,899 | 11/1988 | Ono et al. | 264/108 |

*Primary Examiner*—Jeffery Thurlow
*Attorney, Agent, or Firm*—Earle R. Marden; H. William Petry

[57] ABSTRACT

Method to enhance the electrical conductivity of a carbon-containing film material such as a hot melt for carpet backing. The method involves applying a plurality of arcs across the surface of the film passing under a plurality of electrodes to create a plurality of small crater-like holes in the surface of the film. The film material may be adhered to a carpet material and the crater-like holes acting to increase the anti-static property of the carpet.

9 Claims, 1 Drawing Sheet

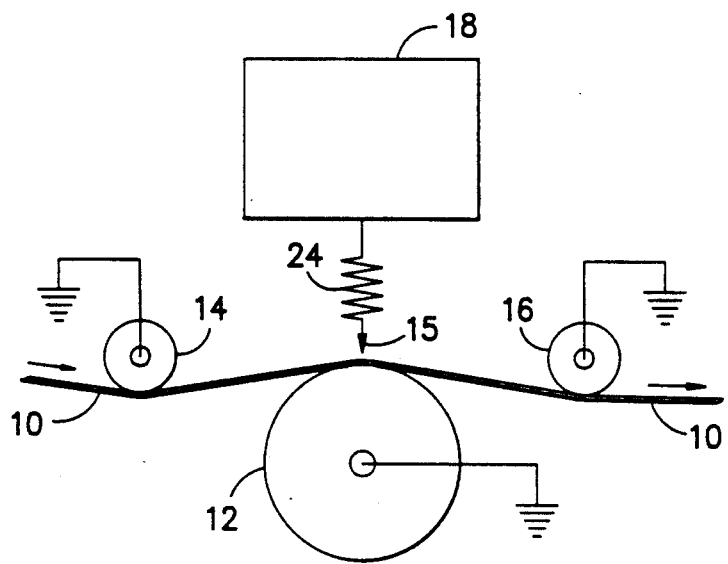
FIG. -1-
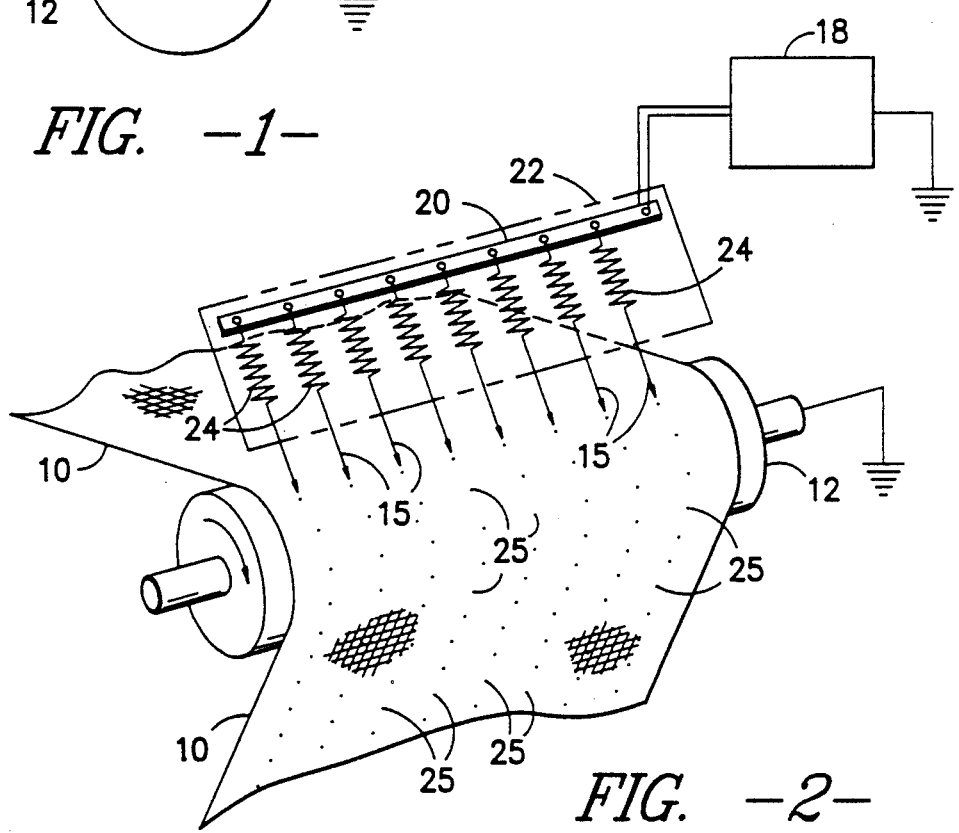
FIG. -2-
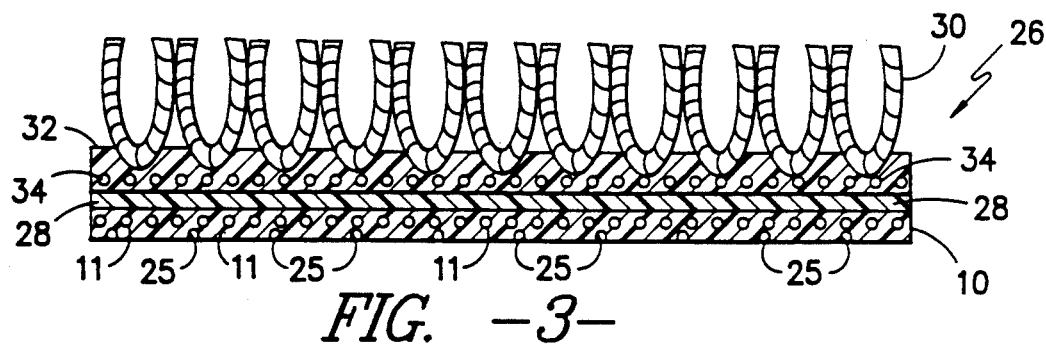
FIG. -3-

METHOD AND PRODUCT TO ENHANCE ELECTRICAL CONDUCTIVITY OF FILMS CONTAINING CONDUCTIVE CARBON BLACK

This is a continuation-in-part of U.S. patent application Ser. No. 342,006, filed Apr. 24, 1989 now abandoned.

It has been found that in the manufacture of conductive films, such as a hot melt film containing conductive carbon black for use as a carpet backing, at the level of conductivity varies widely depending on the temperature and shear applied to such film during manufacture. If the conductivity of any such film is very high it is still useful for the intended purpose but if the electrical conductivity is very low it is necessary to provide some means to enhance the electrical conductivity before it can be used for its intended purpose.

Therefore, it is an object of this invention to provide a method and apparatus to enhance the electrical conductivity of a film containing conductive carbon black to increase the anti-static property of a carpet to which it is adhered.

Other objects and advantages of the invention will become readily apparent as the specification proceeds to describe the invention with reference to the accompanying drawing, in which:

FIG. 1 is a schematic representation of the apparatus to enhance electrical conductivity of a film, FIG. 2 is a perspective view of a portion of the apparatus shown in FIG. 1. and FIG. 3 is a cross-section view of a typical carpet produced by the process.

Looking now to FIGS. 1 and 2, the new and improved apparatus is shown treating a web 10 of carpet backing materials, which in the preferred form of the invention is a hot melt film containing fiberglass 11 therein to provide stability with carbon black and carbon fibers incorporated therein to provide electrostatic conductivity to enhance antistatic capability of a carpet to which it is attached.

The thermoplastic resin adhesive compositions which may be employed according to the present invention include a wide range of thermoplastic, or so-called hot melt adhesives which have been available for many years. Typically such compositions may have a melt viscosity of less than about 200,000 cps, preferably less than about 100,000 cps at 360° F. Examples include for instance, blends of ethylene/vinyl ester copolymer, petroleum wax and a thermoplastic resin as disclosed in U.S. Pat. No. 3,551,231. Other suitable blends which may be used include ethylene/vinyl ester copolymer, low molecular weight, low density polyethylene, microcrystalline wax, aliphatic thermoplastic hydrocarbon resin, dicyclopentadiene alkylation polymer, antioxidant and filler as disclosed in U.S. Pat. No. 3,684,600. Other suitable hot melt adhesives of the ethylene/vinyl ester type which may be used are disclosed in U.S. Pat. Nos. 3,583,936, 3,676,280, 3,684,600, 3,745,054 3,723,371, 3,911,185, 3,914,489 and 4,012,547. Still other hot melt adhesive formulations which may be employed include those of the atactic polypropylene type. In general such compositions may contain a predominant amount, e.g., from about 10 parts to about 100 parts or more, preferably from about 60 parts to 100 parts, by weight atactic polypropylene; from 0 to about 70 parts of another compatible thermoplastic material such as hydrocarbon resins, waxes, polyethylene, especially linear, low density polyethylene; isotactic polypropylene, polyisobutylene and polybutene-1. Fillers in widely varying amounts may be added to such compositions as will be readily apparent to those skilled in the art.

Other compatible thermoplastic materials which may be employed in the adhesive formulation include ethylene/ethyl acrylate, polyacetals, polyesters, polystyrene polyacrylonitrile polyacrylic ester, polymethacrylic ester, polyvinyl chloride, polyvinylidens chloride, polyvinyl acetate, polyvinyl acetal, polyvinyl ether, polytetrafluoroethylene, polyamide, coumarone-/indene resins, natural resins, hydrocarbon resin, bitumen and others.

The particular carbonaceous material employed in the process of the prevent invention is a combination of carbon black and carbon fibers. The carbon fibers to be used may be designated as generally carbonaceous or graphite fibers having certain conductivity characteristics. Examples include those produced from pitch-based fibers as well as those produced by carbonizing polyacrylonitrile fibers, or lignin fibers. The length of the carbon fibers to be used according to the present invention have an average fiber length of from about 0.1 to about 0.2 inch, preferably from about 0.12 inch to about 0.18 inch. If the fibers exceed about 0.2 inch in average length it may be difficult to disperse them uniformly in a thermoplastic backing layer. If the fibers have an average of less than about 0.1 inch the electrical dissipation characteristics of the carpeting may not be satisfactory.

Carbon blacks which are useful in the preparation of the floor covering products of the present invention in general may be characterized as having an average particle size of less than 50 nonometers, preferably from about 15 to 30 nanometers. The carbon black particles may be further characterized as having an average surface area of from about 800 to about 1500 square meters per gram, pore volume of from about 300 to about 500 milliliters per 100 grams and apparent bulk density of from 5 to 10 pounds per cubic foot. Commercially available products which have been found to be suitable for use in the products of the invention are marketed, for example, under EC-600JD Ketjenblack manufactured by Akzo Chemie, America.

It has been found, in particular, that the carbonaceous material should be a combination of both carbon black and carbon fibers. This combination of materials has been found to provide certain unexpected and surprising advantages over the use of either material alone. In particular, it has been found that the incorporation of 100% carbon black having an average size of, say, 30 nanometers into a thermoplastic backing layer tends to increase the relative viscosity of the thermoplastic layer to a level such that processing of the product becomes difficult or impossible. The use of carbon fibers exclusively in the thermoplastic backing layer has been found to be insufficient to achieve the desired electrical conductivity dissipation characteristics in the floor covering product.

As discussed previously, if the web of material 10 does not have the desired electrical conductivity for the desired job, it is necessary to improve and/or increase such conductivity for use as example, as a backing material for carpets and carpet tiles to provide antistatic properties thereto. To achieve the desired result the web of material is guided to and from a grounded metal roll 12 by grounded guide rolls 14 and 16, respectively. Mounted above the roll 12 are a plurality of electrodes 15 spaced approximately "-⅛" above the web of material and supplied DC current from a 4-10 KV power supply 18. As shown schematically in FIG. 2 each of the electrodes 15 are connected to a bus bar 20 in the power distribution box 22 which is connected to the power supply 18. In the preferred form of the invention the electrodes are spaced across the roll.

With the above-described arrangement with a 1 meg ohm resistance 24 in series with the electrode 15 a sufficient voltage is generated to cause an arc between the electrode and the web of film material 10. The 1 meg ohm resistor 24 limits the power than can be sustained in the arc so that the relative movement between the electrodes 15 and the material 10 causes a series of small crater-like holes 25 in the surface of the web of film material 10. This has been found to improve the electrical conductivity of the film material due to either melting the surface of the film material or carbonizing the side of the crater or both.

The following are examples showing the effect of the herein-disclosed method.

EXAMPLE I

Hot melts consisting principally of atactic polypropylene, hydrocarbon resins and calcium carbonate filler were made conductive by the addition of 1% by weight of chopped carbon fiber and 0.3% by weight of EC-600JD, a conductive carbon black manufactured by Akzo Chemie America. The melt was cast into film, while the molten thermoplastic polymer supply and film forming roll surfaces were at the temperatures listed in the following tables. The films contained a nonwoven glass fiber stabilizing membrane and are suitable as a backing material for antistatic carpet.

The conditions used in the electrical discharge treatment were as follows: Voltage 4.5 kv d.c. Spacing between electrodes approximately 1" apart. Current to each discharge electrode 2.5 ma. Speed of treatment about 20 ft./min.

| Film Formation Temperature | Volume Resistance (ohms) | |
| --- | --- | --- |
| | Initial Value | After Treatment Value |
| 420° F. | $2 \times 10^6$ | $1 \times 10^6$ |
| 400 | $8 \times 10^6$ | $1 \times 10^6$ |
| 380 | $2 \times 10^8$ | $1 \times 10^6$ |
| 360 | $2 \times 10^9$ | $3 \times 10^7$ |

The above tests show that the temperature at which films are formed from conductive hot melts can affect the final conductivity. The electrical discharge treatment can substantially improve the conductivity of films cast under less than ideal conditions.

EXAMPLE II

Hot melt films consisting mainly of atactic polypropylene, hydrocarbon resins, calcium carbonate filler and electrically conductive carbonaceous materials. The carbonaceous material was 1% by weight of chopped carbon fiber and the percentage of carbon black is shown in the table. The conductive carbon black use—EC-600JD—is manufactured by Akzo Chemie America.

The conditions used in the electrical discharge treatment were as follows: Voltage 7 kv d.c., Spacing between electrodes 0.75". Speed of treatment about 20 ft./min.

| Film Thickness | % Carbon Black | Resistance - Ohms | |
| --- | --- | --- | --- |
| | | Initial Value | After Treatment Value |
| .050" | .3 | $2 \times 10^5$ | $1.6 \times 10^4$ |
| .075" | .3 | $2 \times 10^5$ | $1.2 \times 10^4$ |
| .050" | .2 | $1 \times 10^{10}$ | $5.5 \times 10^5$ |
| .075" | .2 | $2 \times 10^{10}$ | $5.5 \times 10^5$ |
| .050" | .1 | $1 \times 10^{10}$ | $5.0 \times 10^7$ |
| .070" | .1 | $1 \times 10^{10}$ | $5.0 \times 10^7$ |

The above samples show that the electrical conductivity can be improved for films containing a smaller percentage of conductive carbon black. In this case the treatment would permit a reduction in the amount of carbon black required to achieve a desired conductivity value.

As previously discussed it is preferred that the film 10 be employed as a backing for a carpet or carpet tile, generally designated 26. FIG. 3 shows a typical carpet tile 26 having the new and improved backing material 10 adhered thereto. In manufacturing the carpet tile 26 the film material can be manufactured separately as shown in FIGS. 2 and 3 and laminated to the primary carpet surface with a suitable hot melt adhesive 28 or produced in line and then have the film material 10 treated to create the crater-like holes 25 therein.

In FIG. 3 the primary carpet consists of a pile surface of cut yarns 30 imbedded in a hot melt adhesive backing 32 having fiberglass 34 imbedded therein. In FIG. 3 the yarns are shown as cut pile but could be loop pile and of any desired material such as nylon, polyester, etc. In the preferred form of the invention the carpet is made into wide widths and cut into squares 26 of desired size but, if desired, the carpet can be employed like broadloom to cover large areas of floor.

The herein-disclosed invention provides a method to treat the surface of a carbon containing film to enhance the antistatic properties thereof. This is especially beneficial for the treatment of hot melt films used in the manufacture of carpets and/or carpet tiles.

Although the preferred embodiment of the invention has been described it is contemplated that changes may be made without departing from the scope or spirit of the invention and it is desired that the invention be limited only by the claims.

I claim:

1. The method of enhancing the electrical conductivity of a carbon containing film comprising the steps of: supplying a carbon containing film, passing the film over a grounded metal roll, applying a voltage to the film at a plurality of points from electrodes spaced across the surface thereof to create a series of arcs between the electrode and the film to create small crater-like holes only in the surface of the film and moving the film past the electrodes to form a plurality of lines of small crater-like holes in the film.

2. The method of claim 1 wherein the electrodes are supplied voltage from a DC power source.

3. The method of claim 2 wherein the DC voltage is supplied through a resistance prior to the passage to the electrodes.

4. The method of claim 3 wherein the voltage is in the range of 4-10 KV.

5. The method of claim 4 wherein the resistance is on the order of 1 megohm.

6. A carpet with enhanced anti-static properties comprising: an upper surface with yarns projecting upwardly therefrom and a lower carbon containing film material adhered to the upper surface to provide stability thereto, the bottom of said film material having a series of rows of crater-like holes only in the surface thereof to increase the electrical conductivity of the carpet.

7. The carpet of claim 6 wherein said film material is a hot melt.

8. The carpet of claim 7 wherein a fiberglass is imbedded in the hot melt film material.

9. The carpet of claim 8 wherein the carpet is in the shape of a rectangle or square.

* * * * *